Jan. 13, 1970               L. KATZ             3,489,968
APPARATUS FOR PRODUCING ALTERNATING
CURRENT FROM BRUSHLESS DC MOTOR
Filed Jan. 11, 1966

*INVENTOR*
LEONHARD KATZ

BY *Rines and Rines*

ATTORNEYS

United States Patent Office 3,489,968
Patented Jan. 13, 1970

3,489,968
APPARATUS FOR PRODUCING ALTERNATING CURRENT FROM BRUSHLESS DC MOTOR
Leonhard Katz, Woburn, Mass., assignor to Astro Dynamics, Inc., Burlington, Mass., a corporation of Massachusetts
Filed Jan. 11, 1966, Ser. No. 519,922
Int. Cl. H02k 29/00; H02p 1/00
U.S. Cl. 318—138                                                  5 Claims

ABSTRACT OF THE DISCLOSURE

Multi-phase generator of DC utilizing brushless DC motor, the DC being derived, for example, directly from the primary winding of a push-pull drive circuit or from the starter winding after starting of the motor.

---

The present invention relates to the production of alternating current from direct-current motors and the like; and, more particularly, from brushless motors of the solid-state switching (inverter) type described in my prior U.S. Letters Patent No. 3,098,958, issued July 23, 1963.

The production of alternating-current voltage from direct-current motor apparatus and the like, and, more specifically, mutli-phase alternating-current voltage, has long been considered a most desirable, but economically and otherwise impractical, solution of certain power supply problems, as, for example, in aircraft and other vehicles and the like. It is to a most satisfactory and unexpectedly efficient and facile solution of such problems that the present invention is accordingly directed; it having been discovered that brushless direct-current motors of the above-described type may be simply modified to operate simultaneously also for the production of multi-phase alternating-current voltage.

An object of the invention, accordingly, is to provide a new and improved apparatus for producing single and multi-phase alternating-current voltage with the aid of direct-current motor apparatus and the like (the term "motor" being generically employed herein to connote not only such apparatus in which a rotor is rotated, but in which other loads are controlled by the system); preferably, though not exclusively, motors of the brushless solid-state switching (inverter) type above mentioned.

A further object is to provide a new and improved apparatus for producing alternating-current power of more general application and use, as well.

Other and further objects will be explained hereinafter and will be more particularly pointed out in connection with the appended claims.

The invention will now be described with reference to the accompanying drawings, FIG. 1 of which is a schematic circiut diagram of a preferred embodiment;

Figure 1:
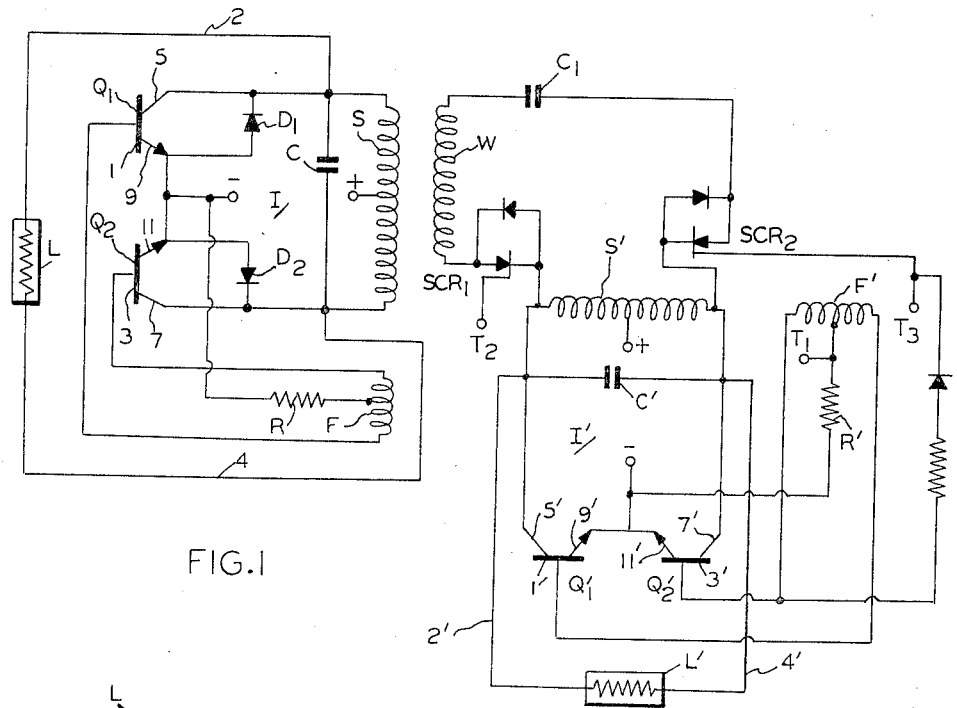

Referring to FIG. 1, the invention is described for illustrative purposes in connection with the preferred solid-state switching relay brushless motor circut of the type disclosed in said Letters Patent, though clearly other types of such circuits can, if desired, be employed. The inverter circuits of two such motors are those illustrated at I and I′ embodying respective similar stator windings S and S′ oriented in proximity to one another and at a geometrical angle of ninety degrees. The rotor coupled to the stator windings is not illustrated in order to avoid confusing the diagram. The motor circuit I employs a pair of push-pull connected switching relays $Q_1$ and $Q_2$, such as solid-state transistor devices, controlled rectifiers, or the like, each shown having respective base electrodes 1, 3, collectors 5, 7, and emitters 9, 11. A capacitor C shunts the terminals of the stator winding S between the collectors 5 and 7, with the emitters 9 and 11 connected together to the negative terminal — of a direct-current source (—, +), the positive terminal + of which is connected to an intermediate tap of the stator winding S. Steering diodes $D_1$ and $D_2$ are respectively connected between the collector and emitter electrodes of each relay device. Switching oscillation-sustaining feedback winding F, coupled to the stator S, is connected at its terminals to the bases 3 and 1 of switching relays $Q_2$ and $Q_1$, with an intermediate tap connected through resistance R to the negative terminal —, all as described in the said Letters Patent. The similar components of motor circuit I′ are designated by the same reference numerals, but with a prime notation.

Such coupled motor circuits I and I′ have been found to operate efficiently and in locked relationship, with speed control available by, for example, application of a control signal variation at terminal $T_1$ of the feedback winding F′. A timing circuit for controlling starting may be connected at terminals $T_2$ and $T_3$ to respective silicon-controlled rectifiers $SCR_1$ and $SCR_2$, or similar gating devices, connected to opposite terminals of stator winding S′ and to starting winding W and capacitor $C_1$.

It has been discovered that by coupling a substantially resistive load L (and/or L′) to the stator winding S (and/or S′), as by direct electrical connections 2–4 (and/or 2′–4′) to the opposite terminals thereof, effective alternating-current energization of the load L (and/or L′) is effected. The alternating-current voltage in the load circuit 2–L–4, moreover, has been found to be in the same phase angle relationship to that in the load circuit 2′–L′–4′ as the geometrical angle between stator windings S and S′; in this case, ninety degrees.

Figure 2:
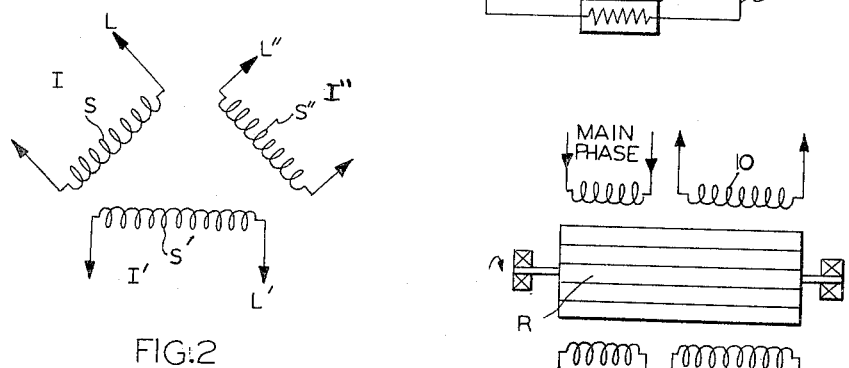
FIG. 2 is a partial circuit diagram of a modification.

Thus, multi-phase alternating-current voltage may be produced in this manner, with the direct-current motors still simultaneously useful for their motor-driving functions, if desired. If sixty-degree multiple-phase alternating current is desired, three such motor circuits I, I′ and I″ may be similarly employed, oriented in sixty degree geometrical relationship, as shown by their respective stator windings S, S′ and S″ in FIG. 2.

In actual practice, a standard 118 LEM motor of the type shown in FIG. 1, marketed by Astro Dynamics, Inc. of Burlington, Mass., has been used to operate resistances and light bulbs connected at L and L′ (of 40 ohms cold resistance) with a total power of 40 watts, and with a motor input of 2 amps and 28 volts at no load. It has further been found that, fortuitously, none of (a) the ninety-degree phase relationship between the alternating-current voltages applied to the load circuits 2–L–4 and 2′–L′–4′, (b) the amplitude or frequency of the substantially square wave-shape voltage, or (c) the speed of the motor, changed significantly with variation between no load and full load conditions, thus providing a most stable and useful alternating-current source.

Figure 3:
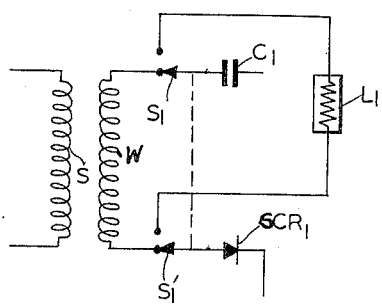
FIG. 3 is still a further partial circuit of a further modification.

It has further been found that, after starting, once the motor is up to speed, ganged switches $S_1$–$S_1$′ (FIG. 3) may be activated to disconnect the starting winding W from the circuit and to connect it with load resistance, including a lamp, to supply the same with alternating-current power, also. Thus, though there is no direct electrical connection to the power stator winding, the magnetic coupling enables alternating-current power to be supplied. Secondary windings magnetically coupled to the stator windings may thus also be used for alternating-current power production, with such windings geometrically oriented to provide the desired multiphases.

Figure 4:
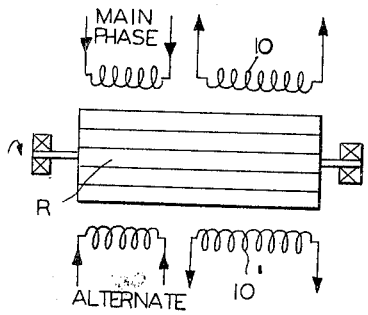
FIG. 4 is a diagrammatic drawing of an additional modified structure.

It has been noted that in single-phase motors, the start phase has a sinusoidal wave shape, even when the main phase has a square wave shape. This may be used to advantage in the arrangement of FIG. 4 where multi-phase windings 10, 10', etc. (coupled to the same rotor bars R as the main and alternate-phase windings, so-labelled) may be spaced evenly or otherwise around the periphery of the common rotor R.

Further modifications will also occur to those skilled in the art and all such are considered to fall within the spirit and scope of the invention as defined in the appended claims.

What is claimed is:

1. Apparatus for producing alternating-current from direct-current and comprising, in combination, a rotor, at least a pair of stator windings disposed at a predetermined angle from one another and coupled to said rotor, each of said stator windings having a pair of switching relays connected in push-pull with the associated winding to comprise an oscillator circuit for sustaining switching oscillations in the stator winding, alternating-current load means, and means for coupling to said load means oscillations from said stator windings, respectively, having electrical phase the same as the space phase of said windings relative to each other, said apparatus being devoid of a phase control circuit interconnecting said windings and said oscillations being produced in the absence of the application of alternating-current to said apparatus from an external source.

2. Apparatus as claimed in claim 1, and in which the coupling means comprises electrical connections to terminals of the stator windings.

3. Apparatus as claimed in claim 1 in which the coupling means comprises further windings magnetically coupled to the stator windings and connected with the load means.

4. Apparatus as claimed in claim 3, and in which the further windings comprise a plurality of secondary windings and the load means comprises a corresponding plurality of load circuits connected thereto.

5. Apparatus as claimed in claim 1, and in which the said angle is one of substantially 90 degrees and 60 degrees.

References Cited

UNITED STATES PATENTS

| | | | |
|---|---|---|---|
| 2,097,577 | 11/1937 | Seitner | 307—156 |
| 3,090,897 | 5/1963 | Hammann | 318—138 |
| 3,146,388 | 8/1964 | Rasor | 318—138 |
| 3,341,723 | 9/1967 | Tourtellot | 310—68 |
| 3,044,023 | 7/1962 | Floyd | 331—113.1 XR |
| 3,141,110 | 7/1964 | Corry | 321—2 XR |
| 3,175,167 | 3/1965 | Lloyd | 318—138 XR |
| 3,235,818 | 2/1966 | Meszaros et al. | 321—2 XR |
| 3,319,104 | 5/1967 | Yasuoka et al. | 318—138 |
| 3,321,687 | 5/1967 | Toth | 331—113.1 XR |
| 3,321,688 | 5/1967 | Vondelden | 318—138 |

OTHER REFERENCES

Soviet Inventions Illustrated, March 1963, p. 10.

ORIS L. RADER, Primary Examiner

G. R. SIMMONS, Assistant Examiner

U.S. Cl. X.R.

318—227; 331—60, 113